United States Patent
Brody et al.

(10) Patent No.: US 11,061,976 B1
(45) Date of Patent: Jul. 13, 2021

(54) HIGH-SIGNAL FRIEND SUGGESTIONS IN A FEED

(71) Applicant: Snap Inc., Santa Monica, CA (US)

(72) Inventors: Jonathan Brody, Marina Del Rey, CA (US); Donald Giovannini, Venice, CA (US); Celia Nicole Mourkogiannis, Los Angeles, CA (US); Jeremy Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 165 days.

(21) Appl. No.: 16/146,934

(22) Filed: Sep. 28, 2018

(51) Int. Cl.
*G06N 20/00* (2019.01)
*G06F 16/9535* (2019.01)
*H04L 29/12* (2006.01)
*G06F 16/248* (2019.01)
*G06F 16/2457* (2019.01)
*G06F 3/0482* (2013.01)
*H04L 29/08* (2006.01)
*G06F 3/0484* (2013.01)

(52) U.S. Cl.
CPC ........ *G06F 16/9535* (2019.01); *G06F 16/248* (2019.01); *G06F 16/24578* (2019.01); *G06N 20/00* (2019.01); *H04L 61/1594* (2013.01); *G06F 3/0482* (2013.01); *G06F 3/0484* (2013.01); *H04L 67/306* (2013.01)

(58) Field of Classification Search
CPC ........... G06F 16/9535; G06F 16/24578; G06F 16/248; G06F 3/0482; G06F 3/0484; G06N 20/00; H04L 61/1594; H04L 67/306

USPC ......................................................... 707/723
See application file for complete search history.

(56) References Cited

U.S. PATENT DOCUMENTS

| | | | | |
|---|---|---|---|---|
| 2008/0120569 | A1* | 5/2008 | Mann | G06F 3/0481 715/792 |
| 2009/0133070 | A1* | 5/2009 | Hamano | H04N 21/4826 725/46 |
| 2014/0189592 | A1* | 7/2014 | Benchenaa | G06F 3/04886 715/835 |
| 2015/0339373 | A1* | 11/2015 | Carlson | G06F 16/287 707/737 |
| 2016/0219150 | A1* | 7/2016 | Brown | H04W 4/16 |
| 2016/0314113 | A1* | 10/2016 | Moharrami | H04L 51/32 |
| 2018/0309801 | A1* | 10/2018 | Rathod | H04L 67/141 |

* cited by examiner

*Primary Examiner* — Hicham Skhoun
(74) *Attorney, Agent, or Firm* — Schwegman Lundberg & Woessner, P.A.

(57) ABSTRACT

Systems, devices, instructions, and methods are provided for a computing device comprising a display screen, with the computing device configured to display on the display screen a content feed interface for communication cells for a plurality of user accounts associated with a first user account, and at least one high-signal suggestion cell of a user account not associated with the first user account. Each of the communication cells is associated with a communication from a corresponding user account of the plurality of user accounts and a direct user interface target area for display of one or more content elements. The high-signal suggestion cell is associated with a set number of actionless impression displays within the content feed interface before the high-signal suggestion cell is removed from the content feed interface.

20 Claims, 12 Drawing Sheets

HIGH-SIGNAL FRIEND SUGGESTIONS IN A FEED

TECHNICAL FIELD

The present disclosure generally relates to facilitating electronic communication between users. In particular, example embodiments of the present disclosure address systems, methods, and user interfaces to facilitate connections between users in a communication system.

BACKGROUND

A content-sharing platform may receive millions of messages from users desiring to share media content such as audio, images, and video between user devices (e.g., mobile devices, personal computers, etc.). The media content of these messages may be shared with accounts associated with the sharing account, allowing users to exchange messages with one another in an application. These applications often provide a graphical interface from which a user can send and receive text-based messages exchanged as part of an electronic conversation with other users. Often these applications run on mobile and other electronic devices that are capable of facilitating other modes of electronic communication such as voice or video calling. Connections between accounts may be based on user approval, and various methods are available for presenting and confirming such approvals to create connections between accounts in a network.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
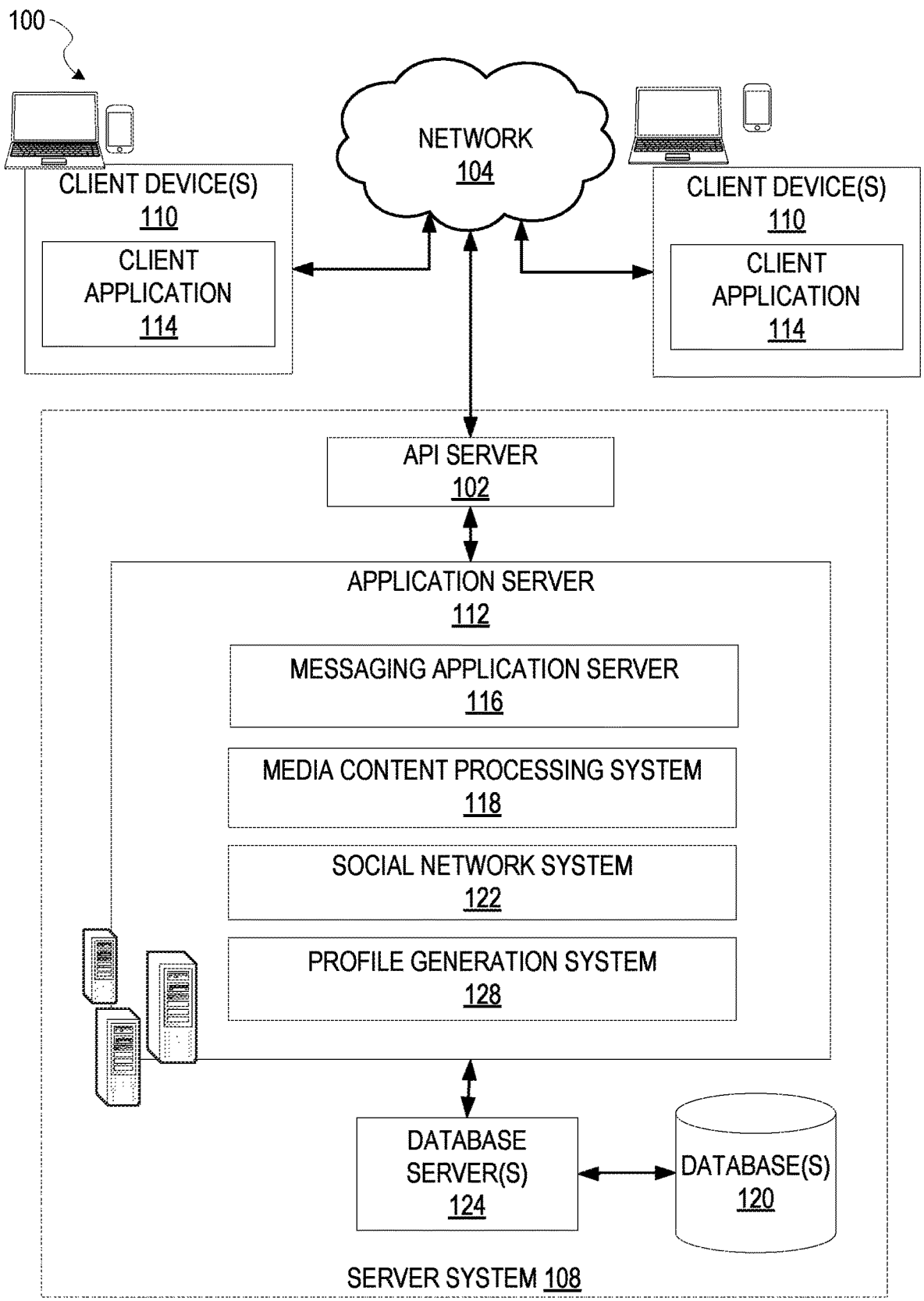
FIG. 1 is a block diagram showing an example messaging system for exchanging data (e.g., messages and associated content) over a network, according to some example embodiments.

Systems and methods described herein relate to user interfaces for presenting information to a user, and systems and methods within such an interface or supporting such an interface for presenting high-signal (e.g., high-quality) suggestions for new connections with other user accounts within a system. The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As described herein, content elements can include text, images, audio clips, video clips, or other multimedia clips captured by an electronic device. Content messages may additionally include associated metadata, along with the content and any data associated with communication of the content via a communication system or application used to present the content. The metadata can be generated by an electronic device capturing the text, image, audio, video, or other multimedia data. The metadata can also be associated with content later by other devices.

In a content-sharing platform with connections between users, or a social network with content-sharing aspects, one possible way to allow users to manage shared content is with a content "feed" interface. Such an interface may include communications or content shared by different users in an ordered and organized fashion, as described in further detail below. Each feed element may be a tile, with sets of content associated with certain tiles. A cell (e.g., tile) is an interactive user interface element. Upon detecting a user interaction with a cell, the client device displays information associated with the cell. In certain embodiments, a cell may provide a direct presentation of content elements. In other embodiments, a cell may provide a link to an additional interface with cells selected based on attributes of the previous cell. For example, a feed may provide individual cells for specific user accounts associated with a first user account. The cells may be sorted in the interface based on the most recent communication between the first user and the user associated with each cell. Such an interface organized around recent communications and connections between accounts may be referred to as a "friend feed."

For users joining a network for the first time, as well as for users with established connections, making new connections between user accounts is an important operation of the system. New users may have difficulty identifying associated accounts to begin communicating with. Established users may present other difficulties, where the established users do not want to be overwhelmed with connection requests at the same time as interacting with already established connections and significant communications from established connections, but at the same time the system may not operate in an effective fashion if such users have a difficult time connecting with new users.

Embodiments described herein provide limited cell impressions (e.g., instances of displaying a cell within a user interface) of high-signal (e.g., analyzed for quality, strength, likelihood of importance or acceptance, etc.) suggestions for connections with other user accounts within a content feed. After a threshold number of impressions are actually presented within the user interface without the user interacting with the cell, the cell is removed from the feed. The cell or a similar interface to initiate a connection may remain in a separate (e.g., non-feed) user interface to allow a connection to be initiated; however, a tag or other metadata is also generated to prevent the same cell from being placed in the content feed again. Such systems provide improvements to known interfaces by managing a content feed with some interspersed information to initiate new contacts, while limiting this additional information. This specific structure for managing new contact offers within a content feed interface provides an improved and more efficient method of generating contacts, particularly for new users with limited contacts. This further provides a more reliable method for enabling users with small numbers of contacts to begin engaging in content communications with contacts in a much more rapid fashion.

The actual presentation of the high-signal suggestion cell may be managed in a variety of ways while surfacing the high-intent friending actions into a feed interface. In some embodiments, this cell may be pinned to the top of the feed during the threshold number of impressions. In other embodiments, it may be positioned in the feed according to standard criteria (e.g., chronological based on time of receipt of latest message or cell update associated with a user). In some embodiments, a single high signal suggestion cell is allowed at any time in the feed. In other embodiments, another limit may be placed based, for example, on acceptance history, use of interface space (e.g., a percentage threshold of screen space at any time), or other such criteria.

FIG. 1 is a block diagram illustrating a networked system 100 (e.g., a messaging system) for exchanging data (e.g., messages and associated content) over a network. In one example, the networked system 100 is a content-sharing platform. Such a platform may include a content feed in accordance with embodiments described herein.

The networked system 100 includes multiple client devices 110, each of which hosts a number of client applications 114. Each client application 114 is communicatively coupled to other instances of the client application 114 and a server system 108 via a network 104.

The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, wearable device, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, Global Positioning System (GPS) devices, and so forth.

The client device 110 may be a device of a user that is used to create media content items such as video, images (e.g., photographs), and audio, and to send and receive messages containing such media content items, text, and so forth, to and from other users. The client device 110 may be a device of a user that is used to create and edit media overlays and create and access a plurality of media collections. The client device 110 may be a device of a user that is used to generate profile information for the user, profile information of other users associated with the user, and profile information of publishers of content.

One or more users may be a person, a machine, or other means of interacting with the client device 110. In example embodiments, the user may not be part of the system 100, but may interact with the system 100 via the client device 110 or other means. For instance, the user may provide input (e.g., touch screen input or alphanumeric input) to the client device 110, and the input may be communicated to other entities in the system 100 (e.g., third-party servers, server system 108, etc.) via the network 104. In this instance, the other entities in the system 100, in response to receiving the input from the user, may communicate information to the client device 110 via the network 104 to be presented to the user. In this way, the user may interact with the various entities in the system 100 using the client device 110.

The system 100 may further include the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI network, a WiMax network, another type of network, or a combination of two or more such networks.

The client device 110 may access the various data and applications provided by other entities in the system 100 via a web client (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, a messaging application, an electronic mail (email) application, an e-commerce site application, a mapping or location application, a media overlay application, an interactive messaging application, and the like.

In some embodiments, one or more client applications 114 may be included in a given one of the client devices 110, and configured to locally provide a user interface and at least some functionalities, with the client application 114 configured to communicate with other entities in the system 100 (e.g., third-party servers, server system 108, etc.), on an as-needed basis, for data and/or processing capabilities not locally available (e.g., to process user queries, to authenticate a user, to verify a method of payment, etc.). Conversely, one or more client applications 114 may not be included in the client device 110, and then the client device 110 may use its web browser to access the one or more applications hosted on other entities in the system 100 (e.g., third-party servers, server system 108, etc.).

In one example, a client application 114 may be a messaging application (e.g., messaging client application 114 as referred to below) that allows a user to take a photograph or video, add a caption to or otherwise edit the photograph or video, and then send the photograph or video to another user. In one example, the message may be ephemeral and be removed from a receiving user device after viewing or after a predetermined amount of time (e.g., 10 seconds, 24 hours, etc.). An ephemeral message refers to a message that is accessible for a time-limited duration. An ephemeral message may be a text, an image, a video, and other such content that may be combined in accordance with embodiments described herein. The access time for the ephemeral message may be set by the message sender. Alternatively, the access time may be a default setting or a setting specified by the recipient. Regardless of the setting technique, the message is transitory.

The messaging application may further allow a user to create a gallery or message collection (also referred to herein as a "media collection"). A gallery may be a collection of photos and videos which may be viewed by other users "following" the user's gallery (e.g., subscribed to view and receive updates in the user's gallery). In one example, the gallery may also be ephemeral (e.g., lasting 24 hours, lasting for a duration of an event (e.g., during a music concert, sporting event, etc.), or lasting another predetermined time).

An ephemeral message may be associated with a message duration parameter, the value of which determines an amount of time that the ephemeral message will be displayed to a receiving user of the ephemeral message by the client application 114. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user to store photographs and videos and create a gallery that is not ephemeral and that can be sent to other users. For example, a user may assemble photographs and videos from a recent vacation to share with friends and family.

The server system 108 may provide server-side functionality via the network 104 (e.g., the Internet or a wide area network (WAN)) to one or more client devices 110 and/or one or more third-party servers (not shown). The server system 108 may include an application programming interface (API) server 102, an application server 112, a messaging application server 116, a media content processing system 118, a social network system 122, and a profile generation system 128, which may be communicatively coupled with each other and with one or more data storage(s), such as one or more databases 120.

The server system 108 may be a cloud-computing environment, according to some example embodiments. The server system 108, and any servers associated with the server system 108, may be associated with a cloud-based application, in one example embodiment.

The one or more databases 120 may be storage devices that store information such as untreated media content, original media content from users (e.g., high-quality media content), processed media content (e.g., media content that is formatted for sharing with client devices 110 and viewing on client devices 110), context data related to a media content item, context data related to a user device (e.g., computing or client device 110), media overlays, media overlay smart widgets or smart elements, user data, user device information, media content (e.g., video and images), media content data (e.g., data associated with video and images), computing device context data, serialized data, session data items, user profile data, publisher profile data, and so forth. The one or more databases 120 may further store information related to third-party servers, third-party applications, client devices 110, client applications 114, users, and so forth.

The one or more databases 120 may include cloud-based storage external to the server system 108 (e.g., hosted by one or more third-party entities external to the server system 108). While the storage devices are shown as database(s) 120, it is to be understood that the system 100 may access and store data in storage devices such as databases 120, blob storages, and other types of storage devices.

The system 100 may further include one or more third-party servers (not shown). The one or more third-party servers may include one or more third-party applications. The one or more third-party applications, executing on the third-party server(s), may interact with the server system 108 via the API server 102 via a programmatic interface provided by the API server 102. For example, one or more of the third-party applications may request and utilize information from the server system 108 via the API server 102 to support one or more features or functions on a website hosted by a third party or an application hosted by the third party. The third-party website or application, for example, may provide functionality that is supported by relevant functionality and data in the server system 108.

Accordingly, each client application 114 is able to communicate and exchange data with other client applications 114 and with the server system 108 via the network 104. The data exchanged between client applications 114, and between a client application 114 and the server system 108, includes functions (e.g., commands to invoke functions) as well as payload data (e.g., text, audio, video, or other multimedia data).

The server system 108 provides server-side functionality via the network 104 to a particular client application 114. While certain functions of the system 100 are described herein as being performed by either a client application 114 or the server system 108, it will be appreciated that the location of certain functionality either within the client application 114 or within the server system 108 is a design choice. For example, it may be technically preferable to initially deploy certain technology and functionality within the server system 108, but to later migrate this technology and functionality to the client application 114 where a client device 110 has a sufficient processing capacity.

The server system 108 supports various services and operations that are provided to the client application 114. Such operations include transmitting data to, receiving data from, and processing data generated by the client application 114. This data may include message content, client device information, geolocation information, media annotation and overlays, message content persistence conditions, social network information, live event information, date and time stamps, media content (e.g., video and images), media content data (e.g., data associated with video and images), and user data, as examples. Data exchanges within the networked system 100 are invoked and controlled through functions available via user interfaces (UIs) of the client application 114.

In the server system 108, the API server 102 is coupled to, and provides a programmatic interface to, the application server 112. The application server 112 is communicatively coupled to a database server 124, which facilitates access to the one or more databases 120 in which is stored data associated with messages processed by the application server 112.

The API server 102 receives and transmits message data (e.g., commands and message payloads) between the client device 110 and the application server 112. Specifically, the API server 102 provides a set of interfaces (e.g., routines and protocols) that can be called or queried by the client application 114 in order to invoke functionality of the application server 112. The API server 102 exposes various functions supported by the application server 112, including account registration; login functionality; the sending of messages, via the application server 112, from a particular client application 114 to another client application 114; the sending of media files (e.g., images or video) from a client application 114 to the messaging application server 116, for possible access by another client application 114; the setting of a collection of media data (e.g., a gallery, story, message collection, or media collection); the retrieval of such collections; the retrieval of a list of friends of a user of a client device 110; the retrieval of messages and content; the adding of friends to and deletion of friends from a social graph; the location of friends within a social graph; opening an application event (e.g., relating to the client application 114); and so forth.

The application server 112 hosts a number of applications and subsystems, including the messaging application server 116, the media content processing system 118, the social network system 122, and the profile generation system 128. The messaging application server 116 implements a number of message processing technologies and functions, particularly related to the aggregation and other processing of content (e.g., textual and multimedia content) included in messages received from multiple instances of the client application 114. The text and media content from multiple sources may be aggregated into collections of content (e.g., called "stories," "galleries." or "media collections"). These collections are then made available, by the messaging application server 116, to the client application 114. Other processor- and memory-intensive processing of data may also be performed server-side by the messaging application server 116, in view of the hardware requirements for such processing.

The application server 112 also includes the media content processing system 118, which is dedicated to performing various media content processing operations, typically with respect to images or video received within the payload of a message at the messaging application server 116. The media content processing system 118 may access one or more data storages (e.g., the database(s) 120) to retrieve stored data to use in processing media content and to store results of processed media content.

The social network system 122 supports various social networking functions and services, and makes these functions and services available to the messaging application server 116. To this end, the social network system 122 maintains and accesses an entity graph 304 (depicted in FIG. 3) within the database(s) 120. Examples of functions and services supported by the social network system 122 include the identification of other users of the networked system 100 with whom a particular user has relationships or whom the particular user is "following," and also the identification of other entities and interests of a particular user.

The messaging application server 116 may be responsible for generation and delivery of messages between users of client devices 110. The messaging application server 116 may utilize any one of a number of message delivery networks and platforms to deliver messages to users. For example, the messaging application server 116 may deliver messages using electronic mail (email), instant message (IM). Short Message Service (SMS), text, facsimile, or voice (e.g., Voice over IP (VoIP)) messages via wired networks (e.g., the Internet), plain old telephone service (POTS), or wireless networks (e.g., mobile, cellular, WI-FI, Long Term Evolution (LTE), or Bluetooth).

The profile generation system 128 supports various functionality related to generating and updating profile information for users and publishers.

Figure 2:
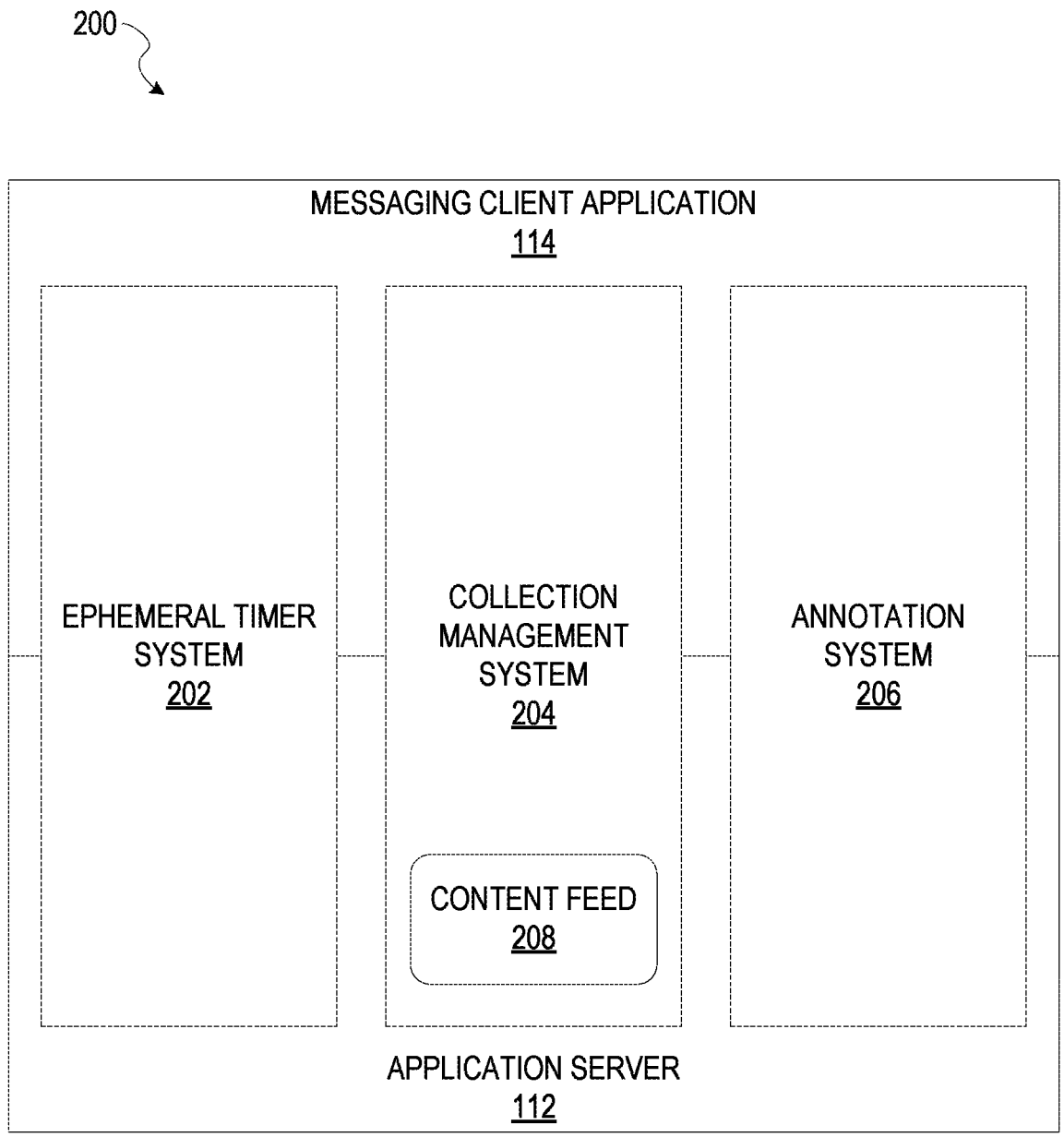
FIG. 2 is a block diagram illustrating further details regarding the messaging system, according to some example embodiments.

FIG. 2 is a block diagram 200 illustrating further details regarding a networked system according to example embodiments. Specifically, the diagram 200 is shown to comprise a messaging client application 114 and the application server 112, which in turn embody a number of subsystems, namely an ephemeral timer system 202, a collection management system 204, and an annotation system 206.

The ephemeral timer system 202 is responsible for enforcing the temporary access to content permitted by the messaging client application 114 and the messaging application server 116. To this end, the ephemeral timer system 202 incorporates a number of timers that, based on duration and display parameters associated with a message, or collection of messages (e.g., otherwise referred to herein as "media collections." "galleries," "message collections," "stories," and the like), selectively display and enable access to messages and associated content via the messaging client application 114.

The collection management system 204 is responsible for managing collections of media (e.g., collections of text, image, video, and audio data), otherwise referred to herein as "media collections." In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 114.

The collection management system 204 furthermore includes a content feed 208 that allows the collection management system 204 to generate content for the content feed 208, as well as determining when to introduce a high-signal suggestion cell into the content feed 208. In some embodiments, the application may make such decisions based on interactions between the collection management system 204 and other resources, including user contact lists or machine learning systems that predict user connections.

The annotation system 206 provides various functions that enable a user to annotate or otherwise modify or edit media content associated with a message. For example, the annotation system 206 provides functions related to the generation and publishing of media overlays for messages processed by the networked system 100. In one example, the annotation system 206 operatively supplies a media overlay (e.g., a filter or media augmentation) to the messaging client application 114 based on a geolocation of the client device 110. In another example, the annotation system 206 operatively supplies a media overlay to the messaging client application 114 based on other information, such as social network information of the user of the client device 110. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 110. For example, the media overlay includes text that can be overlaid on top of a photograph taken by the client device 110. In another example, the media overlay includes an identification of a location (e.g., Venice Beach), a name of a live event, or a name of a merchant (e.g., Beach Coffee House). In another example, the annotation system 206 uses the geolocation of the client device 110 to identify a media overlay that includes the name of a merchant at the geolocation of the client device 110. The media overlay may include other indicia associated with the merchant. The media overlays may be stored in the database(s) 120 and accessed through the database server 124. In some embodiments, the annotation system 206 is used to generate messages in response to a user interacting with a cell or selecting a high-signal suggestion cell.

The annotation system 206 may further enable a user to interact with an interactive message, such as by adding one or more media content items to the interactive message. In one example embodiment, the annotation system 206 provides a publication platform that allows a user or merchant to create an interactive message with a plurality of objects associated with the interactive message for which users may add personal content. For example, a designer may create a video of a rock band with various interactive objects for different members of the band (a drummer, a keyboard player, a guitarist, etc.). The video of the rock band may be made available to users as an interactive message.

In one example embodiment, the annotation system 206 provides a user-based publication platform that enables users to select a geolocation on a map, and upload content associated with the selected geolocation. The user may also specify circumstances under which a particular media overlay is to be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

Figure 3:
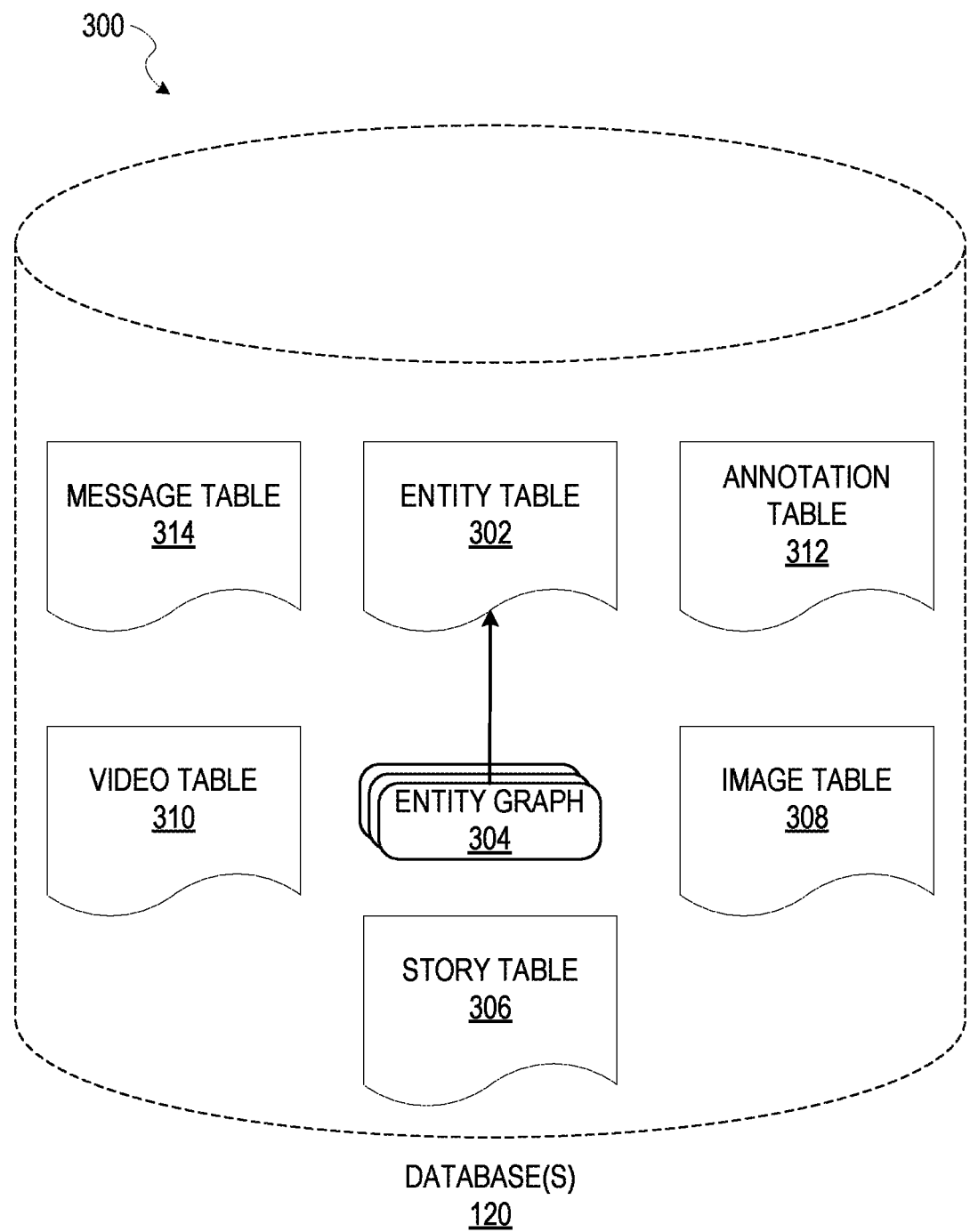
FIG. 3 is a schematic diagram illustrating data which may be stored in a database of a messaging server system, according to some example embodiments.

FIG. 3 is a schematic diagram 300 illustrating data which may be stored in the database(s) 120 of the server system 108, according to certain example embodiments. While the content of the database(s) 120 is shown to comprise a number of tables, it will be appreciated that the data could be stored in other types of data structures (e.g., as an object-oriented database).

The database(s) 120 include message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based, or activity-based, merely for example. In some embodiments, interactive content cells are generated based on relationships identified in the entity graph 304, such that each interactive content cell is associated with a relationship identified in the entity graph 304. High-signal suggestion cells are associated with user accounts not having direct confirmed relationships identified in the entity graph 304. In some embodiments, machine learning (e.g., neural networks) is used to identify and predict relationships expected within the entity graph 304, but not yet present. Such predictions may be used to generate high-signal suggestion cells for the content feed 208.

The database(s) 120 also store annotation data, in the example form of media overlays or filters, in an annotation table 312. Annotation data may also be referred to herein as "creative tools" or "interactive features." Annotation data may comprise predefined interactive messages to be provided to users.

Media overlays or filters, for which data is stored within the annotation table 312, are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 114 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 114, based on geolocation information determined by a GPS unit of the client device 110. Another type of filter is a data filter, which may be selectively presented to a sending user by the messaging client application 114, based on other inputs or information gathered by the client device 110 during the message creation process. Examples of data filters include a current temperature at a specific location, a current speed at which a sending user is traveling, a battery life for a client device 110, or the current time.

Other annotation data that may be stored within the annotation table 312 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story, gallery, or media collection). The creation of a particular collection may be initiated by a particular user (e.g., any user for whom a record is maintained in the entity table 302). A user may create a "personal story" in the form of a collection of content that has been created and sent/broadcast by that user. To this end, the user interface of the messaging client application 114 may include an icon that is user-selectable to enable a sending user to add specific content to his or her personal story. In some embodiments, the content feed 208 is a set of content collections (e.g., stories) for users with relationships in the entity graph 304, with each cell in the content feed 208 associated with a story for a particular user having an entity graph 304 or entity table 302 relationship with the user associated with the client device 110 and user interface for a particular content feed 208.

A media or message collection may also constitute a "live story," which is a collection of content from multiple users that is created manually, automatically, or using a combination of manual and automatic techniques. For example, a "live story" may constitute a curated stream of user-submitted content from various locations and events. Users whose client devices 110 have location services enabled and are at a common event location at a particular time may, for example, be presented with an option, via a user interface of the messaging client application 114, to contribute content to a particular live story. The live story may be identified to the user by the messaging client application 114, based on his or her location. The end result is a "live story" told from a community perspective.

A further type of content collection is known as a "location story," which enables a user whose client device 110 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

In various embodiments, any combinations of such stories, content collections, or individual pieces of content may be used to generate interactive content cells for use in a content feed.

Figure 4:
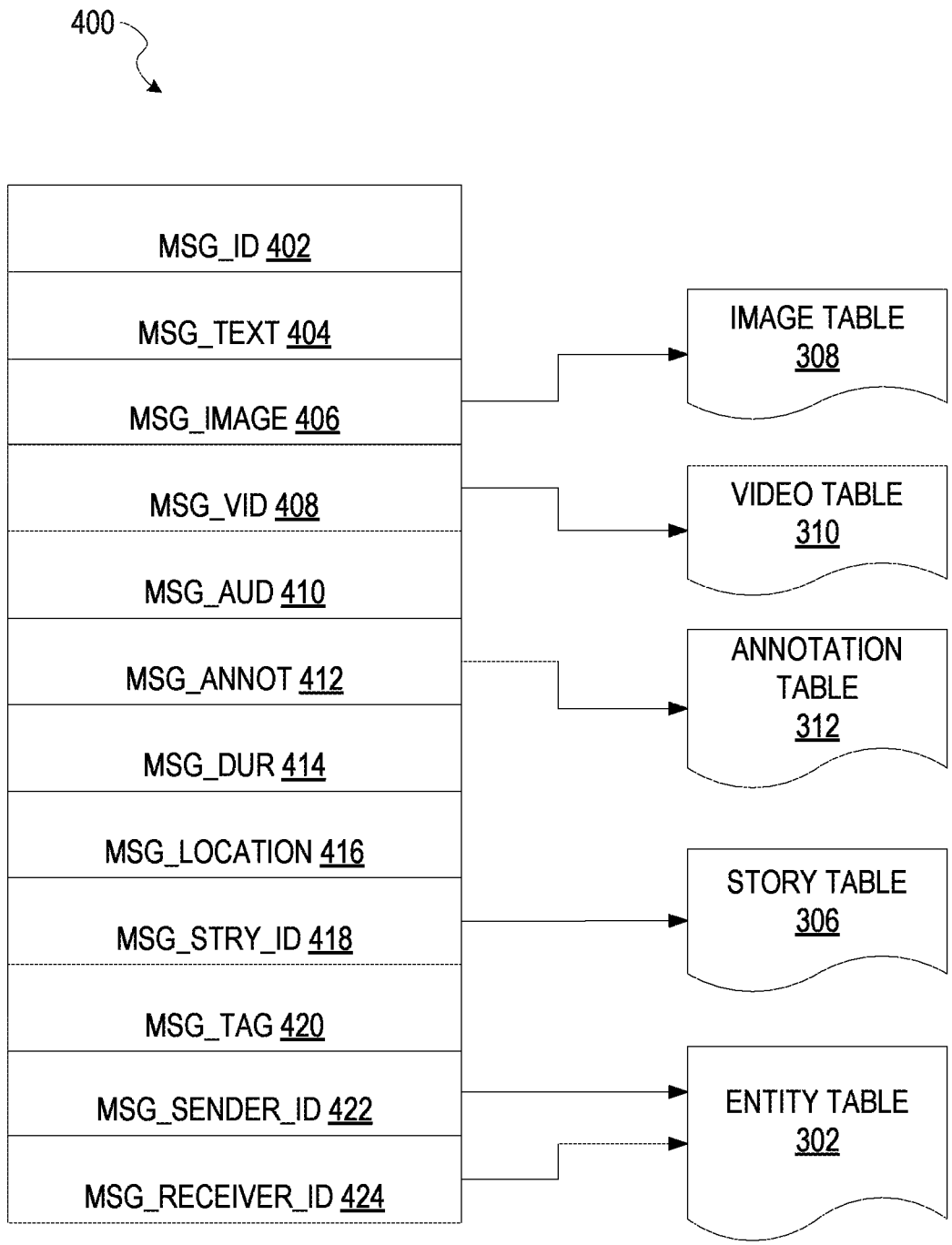
FIG. 4 is a schematic diagram illustrating a structure of a message, according to some embodiments, generated by a messaging client application for communication.

FIG. 4 is a schematic diagram illustrating a structure of a message 400, according to some embodiments, generated by a client application 114 for communication to a further client application 114 or the messaging application server 116. The content of a particular message 400 is used to populate the message table 314 stored within the database(s) 120, accessible by the messaging application server 116. Similarly, the content of a message 400 is stored in memory as "in-transit" or "in-flight" data of the client device 110 or the application server 112. The message 400 is shown to include the following components:

A message identifier 402: a unique identifier that identifies the message 400.

A message text payload 404: text, to be generated by a user via a user interface of the client device 110 and that is included in the message 400.

A message image payload 406: image data, captured by a camera component of a client device 110 or retrieved from memory of a client device 110, and that is included in the message 400.

A message video payload 408: video data, captured by a camera component or retrieved from a memory component of the client device 110 and that is included in the message 400.

A message audio payload 410: audio data, captured by a microphone or retrieved from the memory component of the client device 110, and that is included in the message 400.

Message annotations 412: annotation data (e.g., media overlays such as filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 114.

A message geolocation parameter 416: geolocation data (e.g., latitudinal and longitudinal coordinates) associated with the content payload of the message 400. Multiple message geolocation parameter 416 values may be included in the payload, each of these parameter values being associated with respective content items included in the content (e.g., a specific image within the message image payload 406, or a specific video in the message video payload 408).

A message story identifier 418: identifier values identifying one or more content collections (e.g., "stories") with which a particular content item in the message payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 110 on which the message 400 was generated and from which the message 400 was sent.

A message receiver identifier 424: an identifier (e.g., a messaging system identifier, email address, or device identifier) indicative of a user of the client device 110 to whom the message 400 is addressed.

The contents (e.g., values) of the various components of the message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
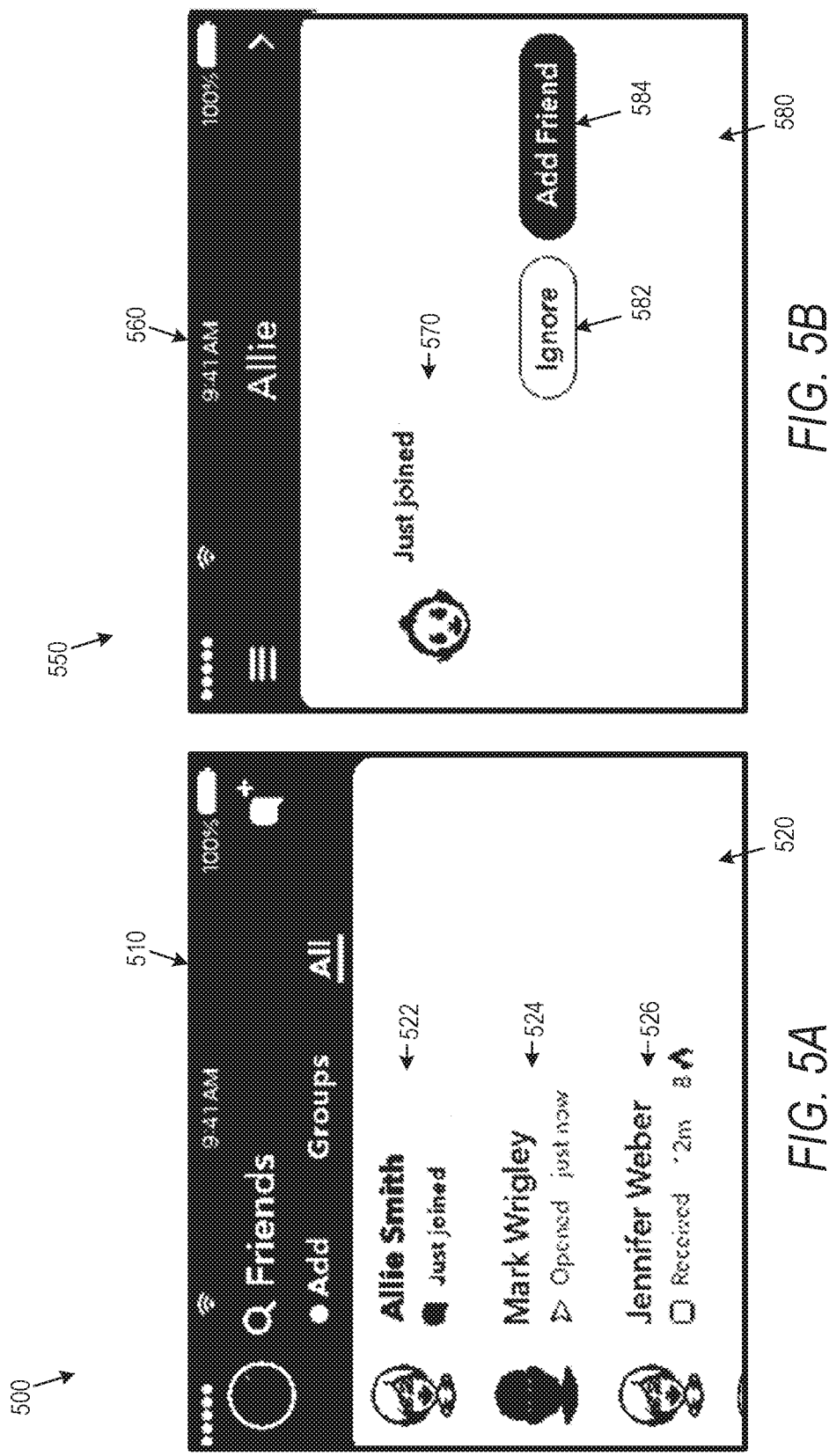
FIG. 5A illustrates aspects of an example graphical user interface, according to some example embodiments.
FIG. 5B illustrates aspects of an example graphical user interface, according to some example embodiments.

FIG. 5A illustrates aspects of an example graphical user interface, according to some example embodiments. FIG. 5A shows a user interface 500, which includes a header 510 as well as a content feed 520. The content feed 520 includes a high-signal suggestion cell 522 and interactive content cells 524 and 526. The user interface 500 is associated with a first user account and is displayed on a display of the first user's device. Each of the cells 522, 524, and 526 is also associated with a user account. The interactive content cells 524 and 526 are associated with accounts having a preexisting relationship with the first user account. The information in the interactive content cells 524 and 526 within the user interface 500 may identify how recently a message was sent, the type of content in the various messages linked to by the cell, the corresponding user account associated with the cell, or any other such information. The high-signal suggestion cell 522, by contrast, is associated with a user account not having a preexisting relationship with the first user account within the system. In the particular embodiment of FIG. 5A, the user account associated with the high-signal suggestion cell 522 has just been created, and the high-signal suggestion cell 522 includes information to that effect. Selecting the high-signal suggestion cell 522 may lead to a linked interface, shown as a user interface 550.

FIG. 5B illustrates aspects of an example graphical user interface, according to some example embodiments. The user interface 550, which is associated with the high-signal suggestion cell 522, includes a header 560 identifying the account associated with the high-signal suggestion cell 522. It also includes a field 580 with an information cell 570, a hit target 582, which is an interface area for ignoring the suggested connection, and a hit target 584, which is an interface area for accepting the suggested connection.

Figure 6:
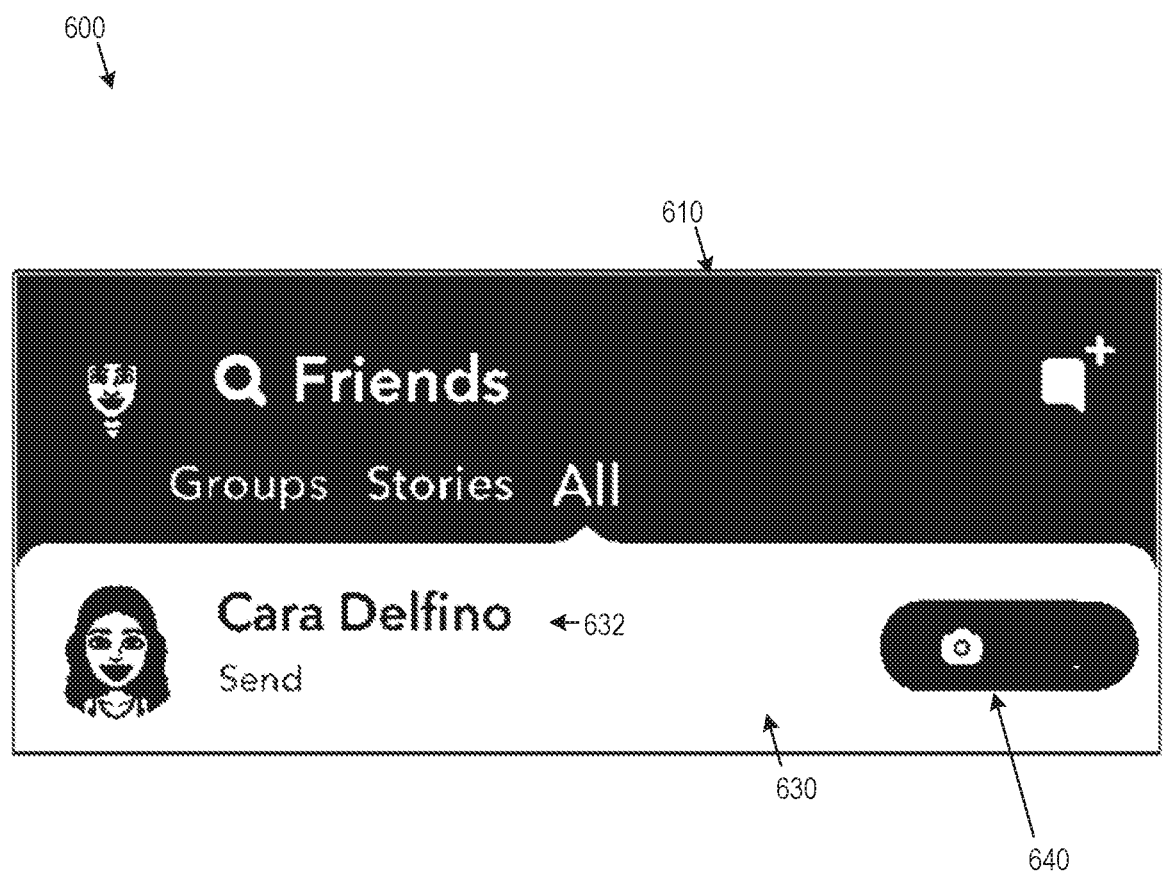
FIG. 6 illustrates aspects of an example graphical user interface, according to some example embodiments.

FIG. 6 illustrates aspects of an example graphical user interface, according to some example embodiments. FIG. 6 shows a user interface 600, with a header 610 and an interactive cell 632 which includes a hit area 640. The cell 632 is part of a content feed 630, although no other cells are shown, and a number of cells may be below the cell 632, including cells to the bottom of a display area, with the option of scrolling further such that the cell 632 scrolls off the top of the scrollable user interface area. The header 610 may be fixed at the top of the display, or may be part of the scrollable user interface area. In some embodiments, when a user adds a connection (e.g., via the hit target 584), the high-signal suggestion cell when the interface returns to the feed is replaced with an interactive cell for the new contact generated by the selection of the new connection. Such a cell further encourages engagement with new users, and provides new users a path to engagement with a higher rate of new contacts than other users. The user may interact with the hit area 640 to generate a content message for transmission to the new contact.

In some embodiments, the presentation of high-signal suggestion cells is based, at least in part, on the age of a user account (e.g., a time since creation). In some embodiments, it may also or alternatively be based on the number of contacts or the rate of new contact additions for a particular account. Accounts with fewer contacts and a lower rate of creation of relationships with other accounts may be presented more high signal suggestion cells. In some embodiments, only accounts which meet such thresholds are presented with high-signal suggestion cells in content feeds.

Figure 7:
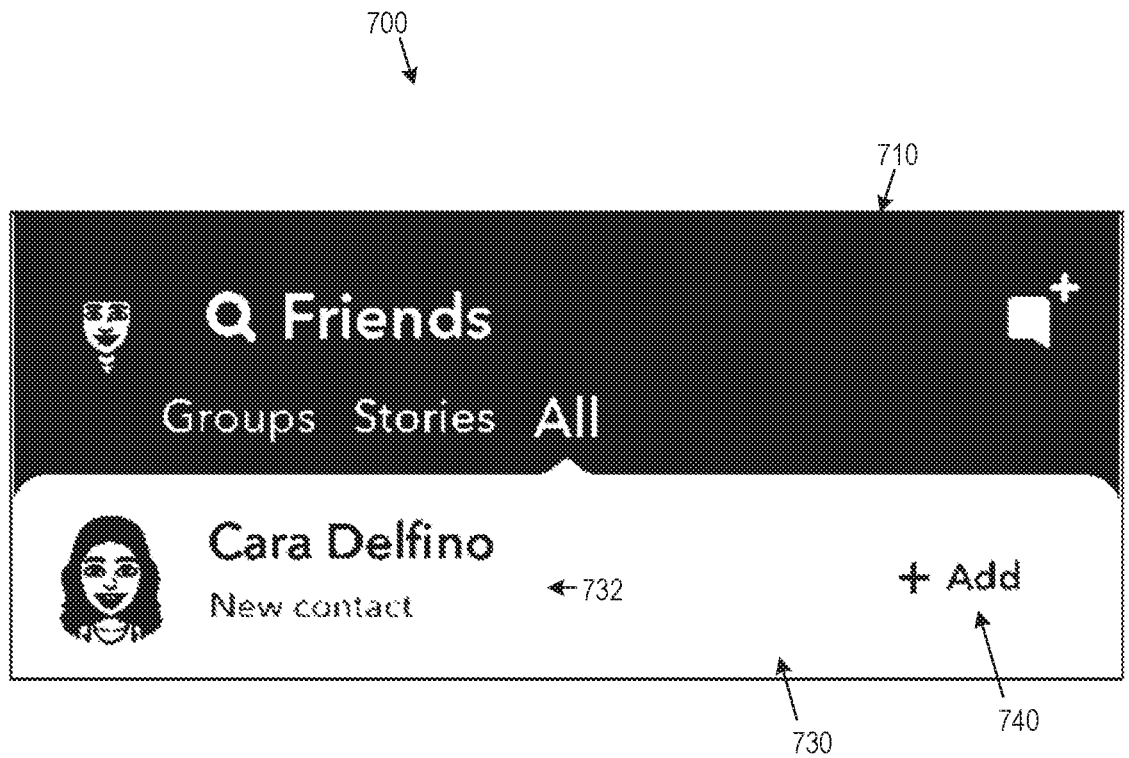
FIG. 7 illustrates aspects of an example graphical user interface, according to some example embodiments.

FIG. 7 illustrates aspects of an example graphical user interface, according to some example embodiments. FIG. 7 illustrates a content feed interface 700 with a high-signal suggestion cell 732 and a header 710. Other interactive content cells may be present in other cell areas that are not shown. In the user interface of FIG. 7, another user has previously been presented with a high-signal suggestion cell, or may have simply sent a relationship indication. The system determines that the relationship meets criteria for a high-signal add back cell, and presents this in a cell area of a content feed 730 of the content feed interface 700. This "add back" election creates a two-way relationship, and prevents a single user from creating the relationship when one account has limits on communications or system relationships. Interacting with a hit area 740 adds the initiating user account as a connection or relationship of the receiving account. In some embodiments, such a high-signal suggestion cell 732 is presented based on a new content quick-add suggestion or quick-add score. In some such embodiments, a system may determine options for potential connections with other users, and the user associated with the high-signal suggestion cell may be selected from the top percentage (e.g., 25%, 10%, etc.) of potential user accounts, or may be selected based on the potential user account match being above a threshold. Such a high-signal suggestion cell may have three hit targets, in some embodiments. A first hit target in such an embodiment is a "longpress" (e.g., a press and hold for more than a longpress threshold time) on any part of the cell, which may open a contact add profile interface which includes any ignored friend recommendation, a share username hit interface, and a settings hit interface. A second hit target may be an add button in an area of the cell indicated by a graphic. The remainder of the cell may be a hit area to enter a chat or communication interface with the identified user account. Such a chat or communication interface may indicate limitations of the communication based on privacy settings of the counterparty account.

In some embodiments, as described above, the creation of a high-signal suggestion may be based on a computed analysis, or score, associated with an expected connection between two user accounts. In some embodiments, even with the use of a score, the generation of high-signal suggestion cells for a content feed may be limited based on other factors. For example, suggestion cells may only be allowed in the content feed if the account associated with the content feed is new (e.g., created less than 14 days ago, 30 days ago, or some other threshold creation time period). In other embodiments, suggestion cells may only be allowed if the user receives less than a threshold rate of account connection adds in a certain time period (e.g., 10 per week, one per day for one week, etc.). Additionally, such thresholds may be adjusted based on the number of connections between a user account and other accounts in the system, such that the greater the number of connections, the more likely the system is to block high-signal suggestion cells from the content feed.

In some embodiments, a scoring model for generating quick-add account connection suggestions used to generate high-signal suggestion cells is generated by feedback or machine learning to set a quality score. Such systems may use neural networks to extract features identified as preferred or interesting to system users. For example, in some embodiments, user accounts may have preferences selected in a system, and comparisons with other user accounts to match those preferences may be performed. In some systems, a user may elect privacy settings which authorize the system to analyze data from a wide variety of sources and match that information to expected connections with other users of the system. Such data may have features extracted and analyzed using a feed-forward artificial neural network such as a convolutional neural network to identify expected desirable connections with other user accounts in the system. Feature maps used within such neural networks may be based on any analysis metric described herein, including both high-signal suggestion cells and cell placement for content cells within a content feed interface. In some embodiments, learnable filters may be selected and automatically updated based on a database of interaction history for previous cells, again based on a user's privacy settings. In other embodiments, any other such sources may be used for learnable filters.

Figure 8:
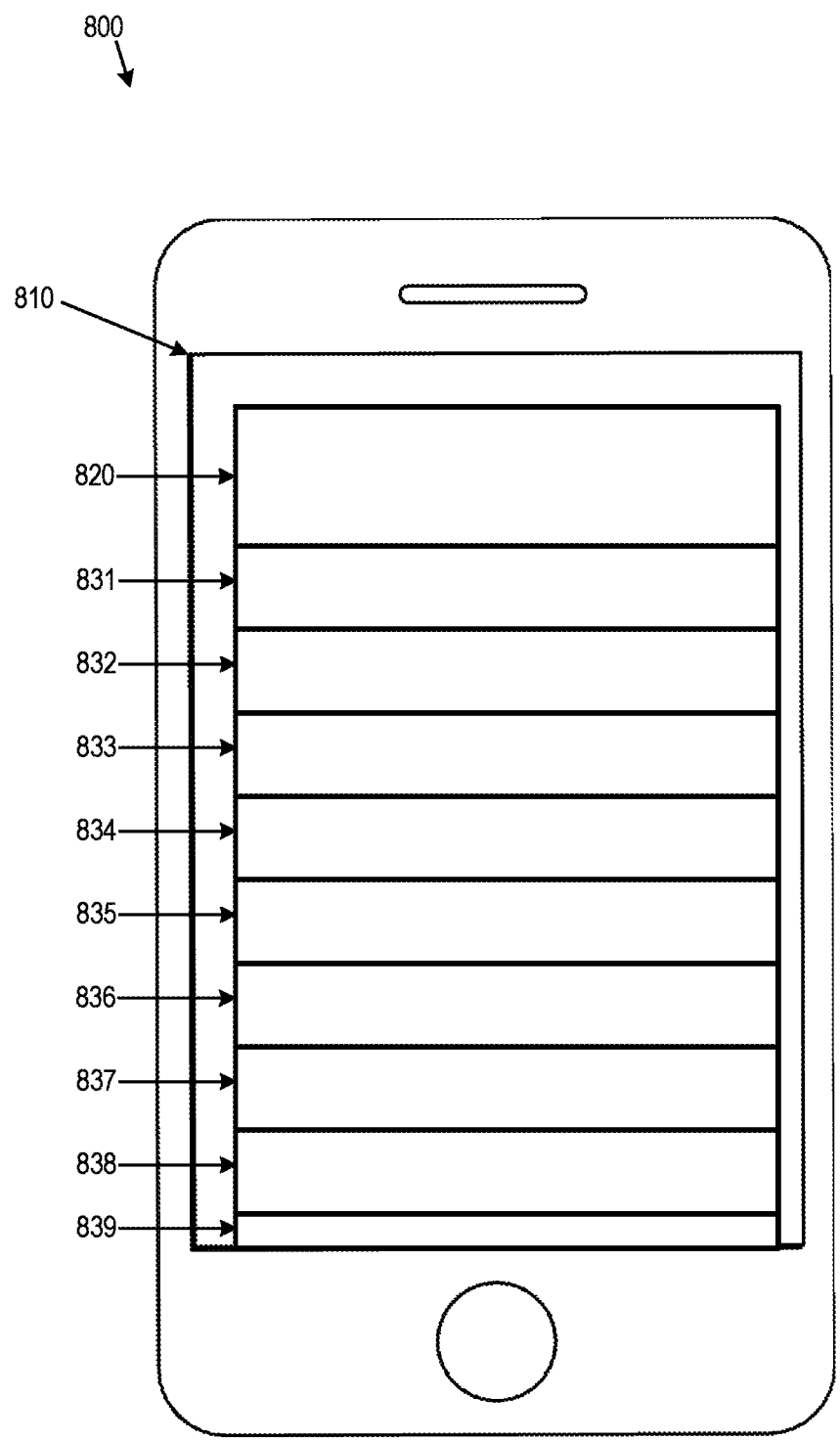
FIG. 8 illustrates aspects of an example graphical user interface, according to some example embodiments.

FIG. 8 illustrates aspects of an example graphical user interface, according to some example embodiments. FIG. 8 includes a device 800 with a display screen 810. The display screen 810 may display a user interface with a content feed as described above, including a header area 820 and cell areas 831-839. Over time, the content within the display screen 810 may change between different user interfaces, and during different impressions, the content of individual cell areas 831-839 may change. For example, as new messages are received, the content in the top cell area 831 may move down to the cell area 832, and content be placed in the cell area 831 based on an interactive cell associated with a user account that has sent the most recent message to the account associated with the user interface. All other content in the cell areas 832-839 may similarly be moved down. The content in the cell area 839 may be removed from the interface or moved to an area of the interface accessible with a scrolling input which shifts the location of the cell areas 831-839 within the display screen 810.

Figure 9:
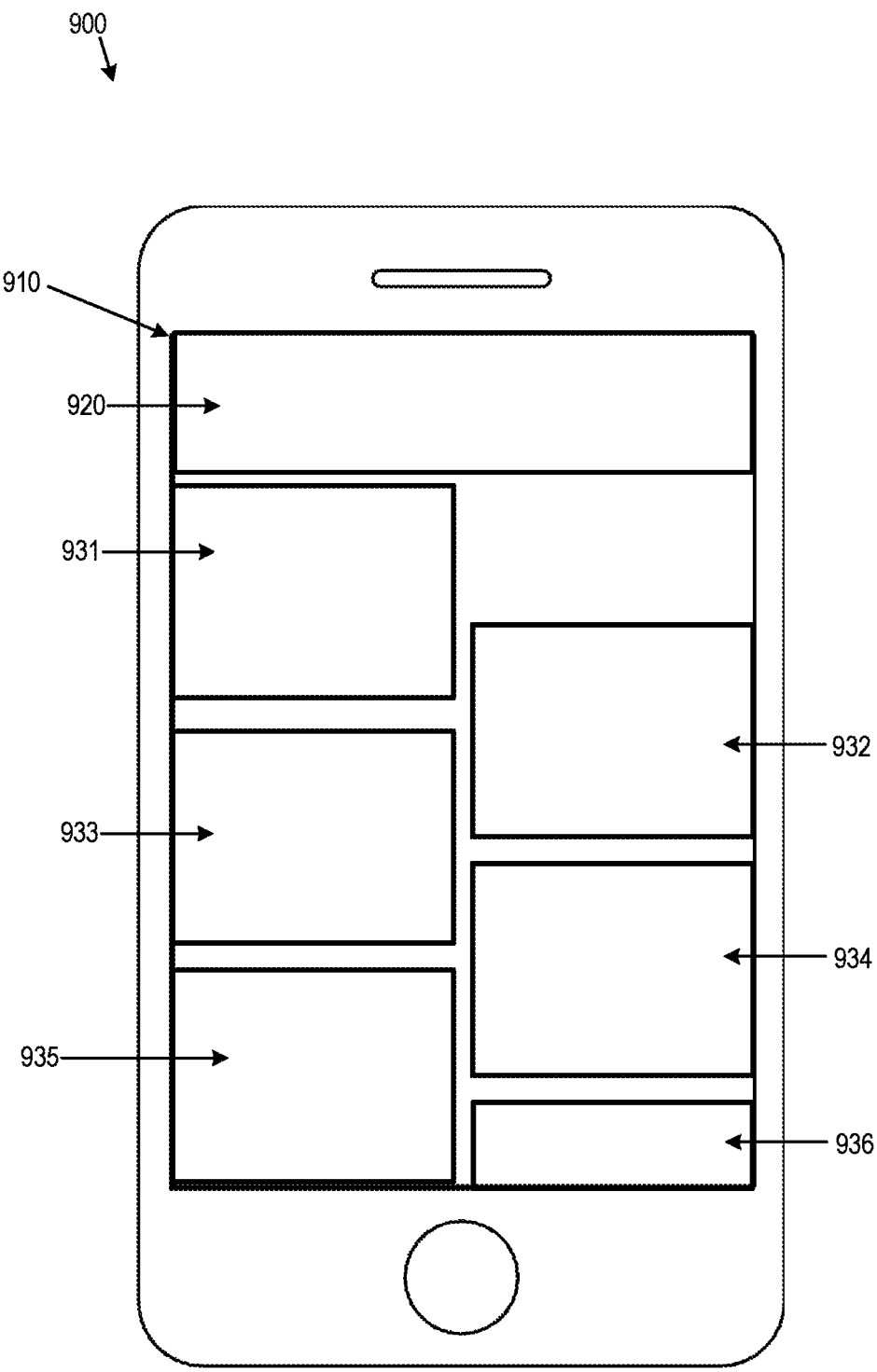
FIG. 9 illustrates aspects of an example graphical user interface, according to some example embodiments.

FIG. 9 illustrates aspects of another example graphical user interface according to some embodiments. FIG. 9 includes a device 900 with a display screen 910. The display screen 910 may display a user interface with a content feed as described above, including a header area 920 and cell areas 931-936. Additional cell areas may be displayed via scroll up and scroll down actions. Over time, the content within the display screen 910 may change between different user interfaces, and during different impressions, the content of individual cell areas may change. For example, as new messages are received, the content in the top cell area 931 may move down to the cell area 932 or the cell area 933, and content be placed in the cell area 931 based on an interactive cell associated with a user account that has sent the most recent message to the account associated with the user interface. All other content in the cell areas 932-936 may similarly be moved down, or otherwise placed in a different cell area. The content in the cell area 936 may be removed from the interface, or moved to an area of the interface accessible with a scrolling input which shifts the location of the cell areas 931-936 within the display screen 910.

In additional embodiments, content within cell areas, including one or more high-signal suggestion cells, may be reordered in other ways besides time-based ordering for content or a most recent piece of content (e.g., content message) associated with the cell. For example, the following describes additional operations for refreshing cell placements in a content feed interface.

A client application on a client device initially displays a plurality of cells each associated with content of an account of a content-sharing network, the plurality of cells being displayed in a first order. The plurality of cells can be displayed in a single column, as illustrated in FIG. 8, or in cell areas horizontally offset from one another as in FIG. 9. The first order may be defined based on a set of rules. The set of rules can include one or more criteria of relevance of a content item represented by a cell to a user of the client device. These criteria can be based on characteristics of the content item, geographic proximity of a location associated with the content item to the user, user interaction with and/or observed trends of the content-sharing network, and aggregated engagement data of users of the content-sharing network with content items. The criteria might also be based on engagement of the user with content items. Engagement might include any kind of interaction with a content item and might be measured with metrics such as a number of views, a sharing rate, a bounce rate, a number of likes, and a number of comments. The client application then determines whether a re-ordering condition for re-ordering the plurality of cells has been satisfied. The re-ordering condition can include a triggering event.

The process for refreshing a content feed may be triggered by the opening of the content feed interface. When the client application returns to the content feed interface under a No Re-Order Threshold, no changes occur to the cell (e.g. tile) order. When the client application returns to the content feed interface over the No Re-Order Threshold but under a Local Re-Order Threshold, the client application may perform a Local Re-Order. In some embodiments, if there is no Internet connection, the client application may not perform a Local Re-Order because the client application will not be able to load any tile images or videos, and instead the client application displays "No Internet connection." When the client application returns to the content feed interface over the Local Re-Order Threshold, the client application can perform a Remote Re-Load. When the client application returns to the content feed interface, and the user opens it (e.g., after a threshold time such as 30 seconds), the client application can perform a Remote Re-Order if there has not been a Remote Re-Order attempt in over a Force Remote Re-Order Threshold. This can override the above logic.

The process for refreshing a content feed interface may be triggered by a user instruction (e.g., a "Pull to Refresh" gesture). In particular, when the user explicitly requests a refresh of the content feed interface, the client application can perform a Remote Re-Order.

The process for refreshing a content feed interface may be triggered by viewing or selection of a tile. For example, in some embodiments, ordering rules may be based on the most recent unseen content. When content is viewed or otherwise selected, the interactive content cell may be removed from the content feed interface, and the remaining cells reordered. Similarly, if a high-signal suggestion cell is selected to either dismiss the cell or accept the suggestion, the cell may be removed from the content feed interface, and the remaining cells refreshed and/or reordered within the user interface.

The process for refreshing a content feed interface may be triggered by a re-displaying of the content feed interface. The process for refreshing a content feed interface may be triggered by additional publishing. In some embodiments, the client application can update tiles for certain content items and stories (e.g., publisher stories) when the author or curator of such content (e.g., a content collection or story for an individual user, or a selectively editable text or audio feed or conversation between one or more user accounts) adds tiles and content items. If the re-ordering condition for re-ordering the plurality of cells has been satisfied, the client application performs a re-ordering (e.g., a "Remote Re-Order").

In some embodiments, the client device transmits a request to a content-sharing network for new content in response to determining that the re-ordering condition has been satisfied. The client device then receives one or more new content items in response to the request from the content-sharing network. If the account associated with an interactive content cell added content items to one of the cells among the plurality of cells, the added content items may be downloaded at this point. New content items associated with cells that were not included in the plurality of cells may also be downloaded. The new content items might be selected based on characteristics of the new content items, geographic proximity of locations associated with the new content items to the user, user interaction with and/or observed trends of the content-sharing network, engagement of the user with similar content items, and aggregated engagement data of users of the content-sharing network with similar content items. The client device then determines a second order for the plurality of cells and one or more new cells representing the one or more new content items. The second order may be defined based on the same set of rules used to define the first order. The parameters on which the criteria of the set of rules are based might have changed since the last time the content feed interface was displayed, and therefore the second order might be different from the first order. For example, the geographic position of the user and therefore the geographic proximity of a location associated with a content item to the user might have changed. Observed trends of the content-sharing network might have changed. In particular, aggregated engagement data of users of the content-sharing network with content items might have changed. If the user engaged with content items since the last time the content feed interface was displayed (e.g., if the user viewed, shared, or liked a story), the engagement data of the user with content items will have changed.

The client device then displays the plurality of cells and the one or more new cells in the second order. The process iterates based on a system timing, to refresh content presented in the user interface. At any refresh, a high-signal suggestion cell may be placed among the interactive content cells associated with user accounts having a relationship with the first account displaying the user interface. Each refresh may count as an impression for the high-signal suggestion cell, and as detailed above, the high-signal suggestion cell may be removed from the interface after a threshold number of impressions. In some embodiments, criteria other than refreshes are used for impressions.

The process can further include determining that content associated with a first cell among the plurality of cells and the one or more new cells has been displayed on a display screen of the client device. The client device then removes the first cell from the plurality of cells. Alternatively, the first cell may not be removed from the plurality of cells and instead ranked at the end of a second order of cells (e.g., if a first order for unviewed content and a second order for viewed content is present in the content feed interface). In some embodiments, the cells associated with content that has been displayed on the display screen are ranked at the end of the second order from most recently viewed to least recently viewed.

Some embodiments provide an improved user interface. A user interface is inherently limited in terms of screen space. As a result, only a limited number of cells can be displayed on a content discovery page. Some embodiments improve the efficiency of using a client device with a user interface by bringing together a limited list of cells related to relevant content, which can be accessed directly from the content discovery page. Displaying selected cells in the content discovery page allows the user to access the most relevant content without having to scroll through a long list of irrelevant stories. The speed of a user's navigation can be improved because embodiments save the user from scrolling to the cell related to the content of interest before opening it to enable the content of interest to be displayed.

If a cell has been displayed among the first cells (e.g. the top cells below a header, or the first cells at the top of a column) for a while, it is likely that the user saw the cell. If the user saw the cell and yet did not select it to view the related story, it is likely that the user has no interest in the story associated with the particular cell. According to some embodiments, the displayed cells are reordered so that cells that were not previously displayed at the top of the content feed interface are displayed at the top of the content feed interface. As a result, the user does not have to scroll through multiple cells to reach a cell of interest. In some embodiments, the cells are not reordered unless a time elapsed since the last time the content feed interface was displayed surpasses a threshold. This prevents cells from being constantly reordered, which would unnecessarily use processor time and render the user interface impractical because cells would be difficult to find since they would constantly be moved around.

Figure 10:
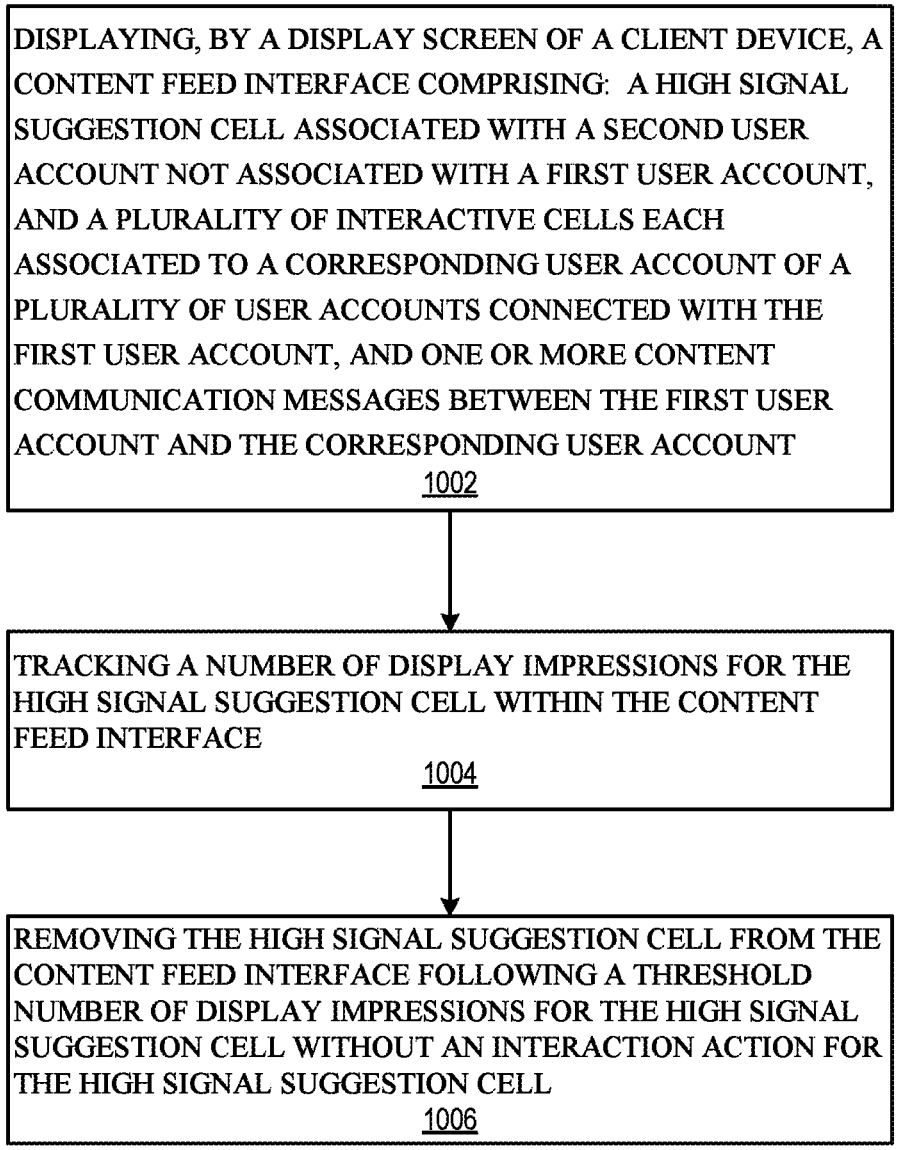
FIG. 10 illustrates a method for using high-signal friend suggestions in a content feed in accordance with embodiments described herein.

FIG. 10 illustrates a method 1000 for using high-signal friend suggestions in a content feed in accordance with embodiments described herein. The method 1000 may be performed by any device described herein. In some embodiments, the method 1000 may be performed by a device that is processing a set of computer-readable instructions stored in a memory of the device and executed by one or more processors of the device. In some other embodiments, similar operations are performed by a server device of a social network or content-sharing network in cooperation with a local device performing some or all of the operations of the method 1000.

The method 1000 begins with operation 1002 which involves displaying, by a display screen of a client device, a content feed interface comprising a high-signal suggestion cell associated with a second user account not associated with a first user account; and a plurality of interactive cells, each associated with a corresponding user account of a plurality of user accounts connected with the first user account, and one or more content communication messages between the first user account and the corresponding user account. In operation 1004, the client device tracks a number of display impressions for the high-signal suggestion cell within the content feed interface. As described above, the display impressions may be based on displays of a certain ordering of cells within an interface, displays of a different ordering of cells following refreshes, or various combinations of such impressions in different embodiments. Operation 1006 then involves removing the high-signal suggestion cell from the content feed interface following a threshold number of display impressions for the high-signal suggestion cell without an interaction with the high-signal suggestion cell.

In various embodiments, additional operations may involve displaying a second high-signal suggestion cell associated with a third user account not associated with the first user account, receiving a first interaction input with the second high-signal suggestion cell, and generating an association between the first user account and the third user account based on the first interaction input with the second high-signal suggestion cell, such that some operations involve interaction with the high-signal suggestion cell to accept the suggestion, while other operations involve the high-signal suggestion cell being removed from a feed when it is ignored for a threshold number of impressions.

Some embodiments involve replacing the second high-signal suggestion cell with a first interactive cell, wherein the first interactive cell is associated with a notification communication between the first user account and the third user account, the notification communication indicating the association between the first user account and the third user account. In some such embodiments, the first interactive cell is generated based on a rate of friend adds for the first user account being below a friend add threshold. In some other embodiments, the friend add threshold is based, at least in part, on an age of the first user account. Such embodiments involve improvements to existing systems by limiting the computing and communication resources devoted to new contact suggestion processes while placing those processes with limits within a high traffic interface for a content feed.

In some embodiments, a notification communication to a user account based on a high-signal suggestion feed may be placed in a pending buffer for the third user account based on a privacy setting for the receiving user account restricting communications from the first user account. Such communications may then be sent when the receiving user account either accepts a connection with the first user account, or changes privacy settings to a condition that allows the notification communication to be sent. The notification communication may be deleted, with a notification to the sender, after a deletion trigger (e.g., time, number of impressions or logins from the recipient ignoring the connection request, etc.).

Some embodiments involve displaying a second high-signal suggestion cell associated with a third user account not associated with the first user account, receiving a first interaction input with the second high-signal suggestion cell, and removing the high-signal suggestion cell from the content feed interface based on the first interaction input. Some embodiments involve adjusting a cell order within the content feed interface to move the high-signal suggestion cell below a first interactive cell of the plurality of interactive cells following receipt of a first content communication associated with the first interactive cell after presentation of a first display impression for the high-signal suggestion cell. Some embodiments involve adjusting a cell order within the content feed interface to change an order of the plurality of interactive cells following receipt of at least one content communication from a user account associated with a cell of the plurality of interactive cells while maintaining the high-signal suggestion cell in a first cell position at the top of the content feed interface until the threshold number of display impressions has been met. Some embodiments involve maintaining the high-signal suggestion cell within an add connection user interface following removal of the high-signal suggestion cell from the content feed interface.

Additional embodiments may operate where the high-signal suggestion cell is created based on a confidence score associated with a predicted connection between the first user account and the second user account. In some such embodiments, the operations further involve adjusting the confidence score following removal of the high-signal suggestion cell from the content feed interface, and generating a metadata tag to prevent placement of a new high-signal suggestion cell for the first user account and the second user account within the content feed interface for the first user account. In some such embodiments, the confidence score is based on a set of contact information associated with the first user account and a set of contact information associated with the second user account. In some such embodiments, the confidence score is generated by a machine learning analysis of user accounts in a content-sharing platform maintaining the plurality of user accounts.

Some embodiments are user interfaces on a computing device, with the computing device configured to display on a display screen a content feed interface for communication cells for a plurality of user accounts associated with a first user account, and at least one high-signal suggestion cell of an account not associated with the first user account, wherein each of the communication cells is associated with a communication from a corresponding account of the plurality of user accounts and a direct user interface target area for display of one or more content elements, and wherein the high-signal suggestion cell is associated with a set number of actionless impression displays within the content feed interface before the high-signal suggestion cell is removed from the content feed interface.

It will be apparent that, although certain embodiments are described herein, additional embodiments are possible within the scope of the described innovations, including embodiments with repeated or intervening operations, or variations on the operations described above.

Figure 11:
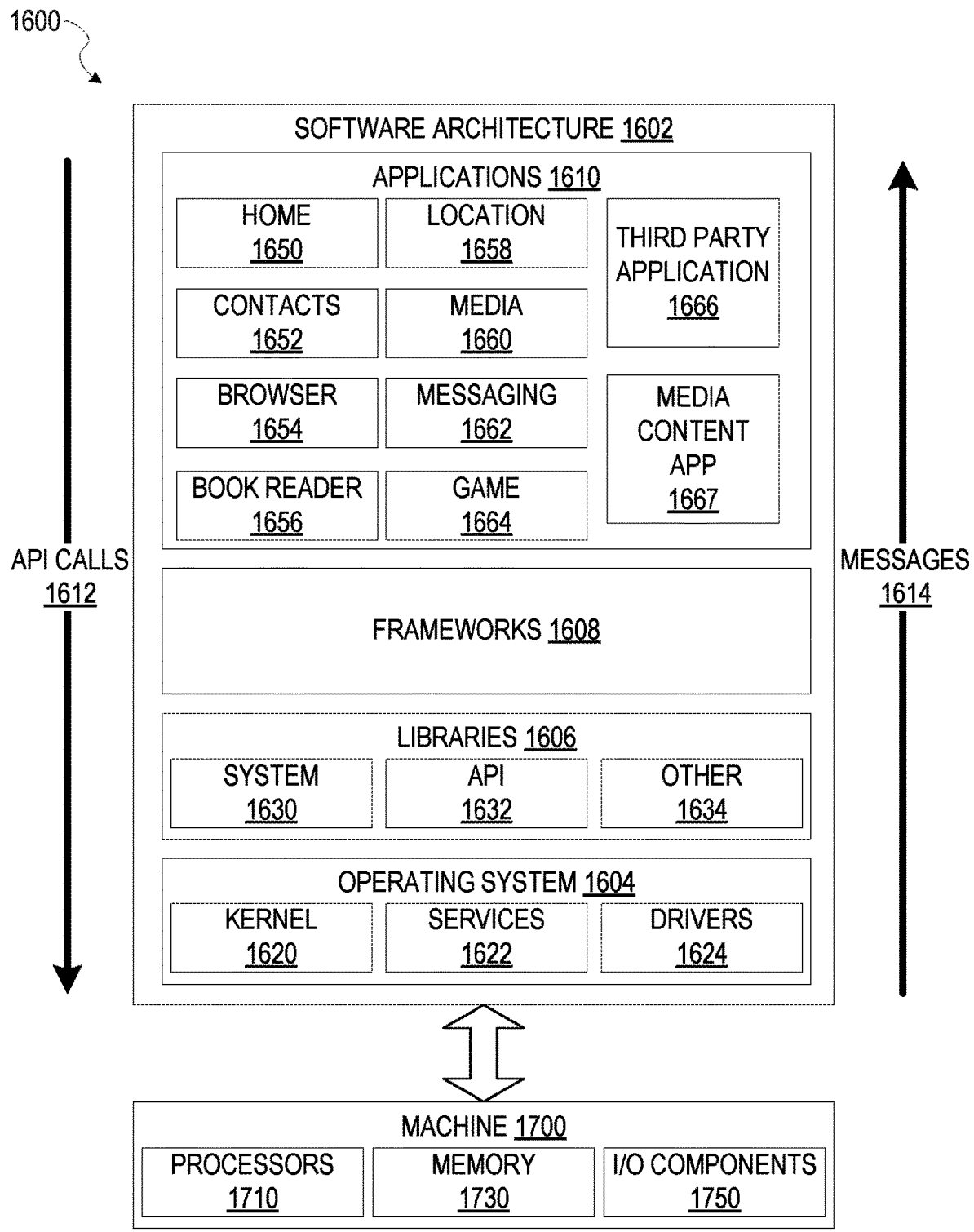
FIG. 11 is a block diagram illustrating an example of a software architecture that may be installed on a machine, according to some example embodiments.

FIG. 11 is a block diagram 1600 illustrating a software architecture 1602, which can be installed on any one or more of the devices described above. For example, in various embodiments, the client devices 110, server system 108. API server 102, application server 112, messaging application server 116, media content processing system 118, social network system 122, database server 124, and profile generation system 128 may be implemented using some or all of the elements of the software architecture 1602. FIG. 11 is merely a non-limiting example of a software architecture, and it will be appreciated that many other architectures can be implemented to facilitate the functionality described herein. In various embodiments, the software architecture 1602 is implemented by hardware such as a machine 1700 of FIG. 12 that includes processors 1710, memory 1730, and I/O components 1750. In this example, the software architecture 1602 can be conceptualized as a stack of layers where each layer may provide a particular functionality. For example, the software architecture 1602 includes layers such as an operating system 1604, libraries 1606, frameworks 1608, and applications 1610. Operationally, the applications 1610 invoke API calls 1612 through the software stack and receive messages 1614 in response to the API calls 1612, consistent with some embodiments.

In various implementations, the operating system 1604 manages hardware resources and provides common services. The operating system 1604 includes, for example, a kernel 1620, services 1622, and drivers 1624. The kernel 1620 acts as an abstraction layer between the hardware and the other software layers, consistent with some embodiments. For example, the kernel 1620 provides memory management, processor management (e.g., scheduling), component management, networking, and security settings, among other functionality. The services 1622 can provide other common services for the other software layers. The drivers 1624 are responsible for controlling or interfacing with the underlying hardware, according to some embodiments. For instance, the drivers 1624 can include display drivers, camera drivers, BLUETOOTH® or BLUETOOTH® Low Energy drivers, flash memory drivers, serial communication drivers (e.g., Universal Serial Bus (USB) drivers), WI-FI drivers, audio drivers, power management drivers, and so forth.

In some embodiments, the libraries 1606 provide a low-level common infrastructure utilized by the applications 1610. The libraries 1606 can include system libraries 1630 (e.g., C standard library) that can provide functions such as memory allocation functions, string manipulation functions, mathematic functions, and the like. In addition, the libraries 1606 can include API libraries 1632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3). Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render two-dimensional (2D) and three-dimensional (3D) graphic content on a display), database libraries (e.g., SQLite to provide various relational database functions), web libraries (e.g., WebKit to provide web browsing functionality), and the like. The libraries 1606 can also include a wide variety of other libraries 1634 to provide many other APIs to the applications 1610.

The frameworks 1608 provide a high-level common infrastructure that can be utilized by the applications 1610, according to some embodiments. For example, the frameworks 1608 provide various graphic user interface (GUI)

functions, high-level resource management, high-level location services, and so forth. The frameworks 1608 can provide a broad spectrum of other APIs that can be utilized by the applications 1610, some of which may be specific to a particular operating system 1604 or platform.

In an example embodiment, the applications 1610 include a home application 1650, a contacts application 1652, a browser application 1654, a book reader application 1656, a location application 1658, a media application 1660, a messaging application 1662, a game application 1664, and a broad assortment of other applications such as a third-party application 1666. According to some embodiments, the applications 1610 are programs that execute functions defined in the programs. Various programming languages can be employed to create one or more of the applications 1610, structured in a variety of manners, such as object-oriented programming languages (e.g., Objective-C, Java, or C++) or procedural programming languages (e.g., C or assembly language). In a specific example, the third-party application 1666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1666 can invoke the API calls 1612 provided by the operating system 1604 to facilitate functionality described herein.

Some embodiments may particularly include a media content application 1667. In certain embodiments, this may be a standalone application that operates to manage communications with a server system such as third-party servers or the server system 108. In other embodiments, this functionality may be integrated with another application (e.g., the messaging application 1662). The media content application 1667 may request and display various data related to messaging, media content, media collections, media overlays, user profiles, publisher profiles, and so forth, and may provide the capability for a user to input data related to the system via a touch interface, via a keyboard, or using a camera device of the machine 1700, communication with a server system via the I/O components 1750, and receipt and storage of object data in the memory 1730. Presentation of information and user inputs associated with the information may be managed by the media content application 1667 using different frameworks 1608, library 1606 elements, or operating system 1604 elements operating on the machine 1700.

Figure 12:
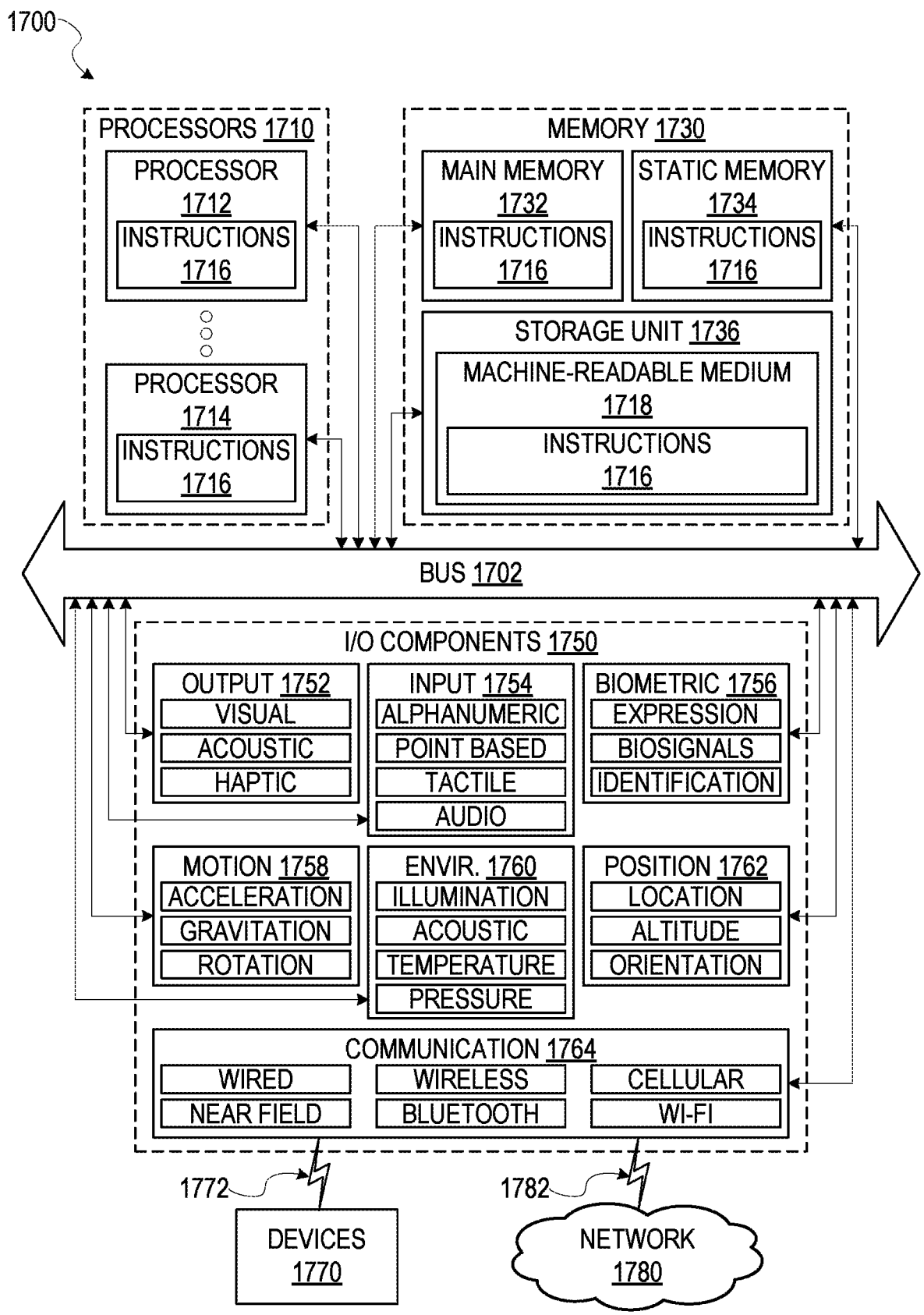
FIG. 12 illustrates a diagrammatic representation of a machine, in the form of a computer system, within which a set of instructions may be executed for causing the machine to perform any one or more of the methodologies discussed herein, according to an example embodiment.

FIG. 12 is a block diagram illustrating components of a machine 1700, according to some embodiments, able to read instructions from a machine-readable medium (e.g., a machine-readable storage medium) and perform any one or more of the methodologies discussed herein. Specifically, FIG. 12 shows a diagrammatic representation of the machine 1700 in the example form of a computer system, within which instructions 1716 (e.g., software, a program, an application, an applet, an app, or other executable code) for causing the machine 1700 to perform any one or more of the methodologies discussed herein can be executed. In alternative embodiments, the machine 1700 operates as a standalone device or can be coupled (e.g., networked) to other machines. In a networked deployment, the machine 1700 may operate in the capacity of a server system 108, application server 112, messaging application server 116, media content processing system 118, social network system 122, database server 124, profile generation system 128, and the like, or a client device 110 in a server-client network environment, or as a peer machine in a peer-to-peer (or distributed) network environment. The machine 1700 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1716, sequentially or otherwise, that specify actions to be taken by the machine 1700. Further, while only a single machine 1700 is illustrated, the term "machine" shall also be taken to include a collection of machines 1700 that individually or jointly execute the instructions 1716 to perform any one or more of the methodologies discussed herein.

In various embodiments, the machine 1700 comprises processors 1710, memory 1730, and IO components 1750, which can be configured to communicate with each other via a bus 1702. In an example embodiment, the processors 1710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1712 and a processor 1714 that may execute the instructions 1716. The term "processor" is intended to include multi-core processors 1710 that may comprise two or more independent processors 1712, 1714 (also referred to as "cores") that can execute instructions 1716 contemporaneously. Although FIG. 12 shows multiple processors 1710, the machine 1700 may include a single processor 1710 with a single core, a single processor 1710 with multiple cores (e.g., a multi-core processor 1710), multiple processors 1712, 1714 with a single core, multiple processors 1712.1714 with multiple cores, or any combination thereof.

The memory 1730 comprises a main memory 1732, a static memory 1734, and a storage unit 1736 accessible to the processors 1710 via the bus 1702, according to some embodiments. The storage unit 1736 can include a machine-readable medium 1718 on which are stored the instructions 1716 embodying any one or more of the methodologies or functions described herein. The instructions 1716 can also reside, completely or at least partially, within the main memory 1732, within the static memory 1734, within at least one of the processors 1710 (e.g., within the processor's cache memory), or any suitable combination thereof, during execution thereof by the machine 1700. Accordingly, in various embodiments, the main memory 1732, the static memory 1734, and the processors 1710 are considered machine-readable media 1718.

As used herein, the term "memory" refers to a machine-readable medium 1718 able to store data temporarily or permanently and may be taken to include, but not be limited to, random-access memory (RAM), read-only memory (ROM), buffer memory, flash memory, and cache memory. While the machine-readable medium 1718 is shown, in an example embodiment, to be a single medium, the term "machine-readable medium" should be taken to include a single medium or multiple media (e.g., a centralized or distributed database, or associated caches and servers) able to store the instructions 1716. The term "machine-readable medium" shall also be taken to include any medium, or combination of multiple media, that is capable of storing instructions (e.g., instructions 1716) for execution by a machine (e.g., machine 1700), such that the instructions 1716, when executed by one or more processors of the machine 1700 (e.g., processors 1710), cause the machine 1700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1750 include a wide variety of components to receive input, provide output, produce output, transmit information, exchange information, capture measurements, and so on. In general, it will be appreciated that the I/O components 1750 can include many other components that are not shown in FIG. 12. The I/O components 1750 are grouped according to functionality merely for simplifying the following discussion, and the grouping is in no way limiting. In various example embodiments, the I/O components 1750 include output components 1752 and input components 1754. The output components 1752 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1750 include biometric components 1756, motion components 1758, environmental components 1760, or position components 1762, among a wide array of other components. For example, the biometric components 1756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1758 include acceleration sensor components (e.g., accelerometer), gravitation sensor components, rotation sensor components (e.g., gyroscope), and so forth. The environmental components 1760 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction sensors, gas sensors to detect concentrations of hazardous gases for safety or to measure pollutants in the atmosphere), or other components that may provide indications, measurements, or signals corresponding to a surrounding physical environment. The position components 1762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The IO components 1750 may include communication components 1764 operable to couple the machine 1700 to a network 1780 or devices 1770 via a coupling 1782 and a coupling 1772, respectively. For example, the communication components 1764 include a network interface component or another suitable device to interface with the network 1780. In further examples, the communication components 1764 include wired communication components, wireless communication components, cellular communication components, near field communication (NFC) components. BLUETOOTH® components (e.g., BLUETOOTH® Low Energy), WI-FI components, and other communication components to provide communication via other modalities. The devices 1770 may be another machine 1700 or any of a wide variety of peripheral devices (e.g., a peripheral device coupled via a Universal Serial Bus (USB)).

Moreover, in some embodiments, the communication components 1764 detect identifiers or include components operable to detect identifiers. For example, the communication components 1764 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code. Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1764, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 1780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FIT network, another type of network, or a combination of two or more such networks. For example, the network 1780 or a portion of the network 1780 may include a wireless or cellular network, and the coupling 1782 may be a Code Division Multiple Access (CDMA) connection, a Global System for Mobile communications (GSM) connection, or another type of cellular or wireless coupling. In this example, the coupling 1782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks. Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1716 are transmitted or received over the network 1780 using a transmission medium via a network interface device (e.g., a network interface component included in the communication components 1764) and utilizing any one of a number of well-known transfer protocols (e.g., Hypertext Transfer Protocol (HTTP)). Similarly, in other example embodiments, the instructions 1716 are transmitted or received using a transmission medium via the coupling 1772 (e.g., a peer-to-peer coupling) to the devices 1770. The term "transmission medium" shall be taken to include any intangible medium that is capable of storing, encoding, or carrying the instructions 1716 for execution by the machine 1700, and includes digital or analog communications signals or other intangible media to facilitate communication of such software.

Furthermore, the machine-readable medium 1718 is non-transitory (in other words, not having any transitory signals) in that it does not embody a propagating signal. However, labeling the machine-readable medium 1718 "non-transitory" should not be construed to mean that the medium is incapable of movement; the machine-readable medium 1718 should be considered as being transportable from one physical location to another. Additionally, since the machine-readable medium 1718 is tangible, the machine-readable medium 1718 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "r" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   displaying, by a display screen of a client device, a content feed interface comprising:
   a high-signal suggestion cell that is selectable to initiate a connection between a second user account and a first user account of a content-sharing platform such that a second user associated with the second user account is added to a social graph of a first user associated with the first user account, wherein the second user account does not have a preexisting relationship with the first user account,
   a plurality of interactive cells each associated with a corresponding user account of a plurality of user accounts connected with the first user account, and
   one or more content communication messages between the first user account and one or more user accounts of the plurality of user accounts, the one or more user accounts corresponding to one or more users of the content-sharing platform included in the social graph of the first user;
   determining a number of display impressions for the high-signal suggestion cell within the content feed interface, the number of display impressions indicating a number of instances of displaying the high-signal suggestion cell within the content feed interface in association with the first user account;
   determining that an interaction with the high-signal suggestion cell has not taken place following a threshold number of display impressions; and
   responsive to determining that an interaction with the high-signal suggestion cell has not taken place following the threshold number of display impressions, removing the high-signal suggestion cell from the content feed interface.

2. The method of claim 1 further comprising:
   displaying a second high-signal suggestion cell associated with a third user account not associated with the first user account;
   receiving a first interaction input with the second high-signal suggestion cell; and
   generating an association between the first user account and the third user account based on the first interaction input with the second high-signal suggestion cell.

3. The method of claim 2 further comprising:
   replacing the second high-signal suggestion cell with a first interactive cell in the content feed interface, wherein the first interactive cell is associated with a notification communication between the first user account and the third user account, the notification communication indicating the association between the first user account and the third user account.

4. The method of claim 3 wherein the first interactive cell is generated based on a rate of friend adds for the first user account being below a friend add threshold.

5. The method of claim 4 wherein the friend add threshold is based, at least in part, on an age of the first user account.

6. The method of claim 3 wherein the notification communication to the third user account is placed in a pending buffer for the third user account based on a privacy setting for the third user account restricting communications from the first user account to the third user account.

7. The method of claim 1 further comprising:
displaying a second high-signal suggestion cell associated with a third user account not associated with the first user account;
receiving a first interaction input with the second high-signal suggestion cell; and
removing the second high-signal suggestion cell from the content feed interface based on the first interaction input.

8. The method of claim 1 further comprising:
adjusting a cell order within the content feed interface to move the high-signal suggestion cell below a first interactive cell of the plurality of interactive cells following receipt of a first content communication associated with the first interactive cell after presentation of a first display impression for the high-signal suggestion cell.

9. The method of claim 1 further comprising:
adjusting a cell order within the content feed interface to change an order of the plurality of interactive cells following receipt of at least one content communication from a user account associated with a cell of the plurality of interactive cells while maintaining the high-signal suggestion cell in a first cell position at a top of the content feed interface until the threshold number of display impressions has been met.

10. The method of claim 1 further comprising maintaining the high-signal suggestion cell within an add connection user interface following removal of the high-signal suggestion cell from the content feed interface, the add connection interface being separate from the content feed interface.

11. The method of claim 1 wherein the high-signal suggestion cell is created based on a confidence score associated with a predicted connection between the first user account and the second user account.

12. The method of claim 11 further comprising:
adjusting the confidence score following removal of the high-signal suggestion cell from the content feed interface; and
generating a metadata tag to prevent placement of a new high-signal suggestion cell for the first user account and the second user account within the content feed interface for the first user account.

13. The method of claim 12 wherein the confidence score is based on a set of contact information associated with the first user account and a set of contact information associated with the second user account.

14. The method of claim 12 wherein the confidence score is generated by a machine learning analysis of user accounts in a content-sharing platform maintaining the plurality of user accounts.

15. A non-transitory computer-readable storage medium comprising instructions that, when executed by one or more processors of a device, cause the device to perform operations comprising:
displaying, by a display screen of the device, a content feed interface comprising:
a high-signal suggestion cell that is selectable to initiate a connection between a second user account and a first user account of a content-sharing platform such that a second user associated with the second user account is added to a social graph of a first user associated with the first user account, wherein the second user account does not have a preexisting relationship with the first user account,
a plurality of interactive cells each associated with a corresponding user account of a plurality of user accounts connected with the first user account, and
one or more content communication messages between the first user account and one or more user accounts of the plurality of user accounts the one or more user accounts corresponding to one or more users of the content-sharing platform included in the social graph of the first user;
determining a number of display impressions for the high-signal suggestion cell within the content feed interface, the number of display impressions indicating a number of instances of displaying the high-signal suggestion cell within the content feed interface in association with the first user account; and
determining that an interaction with the high-signal suggestion cell has not taken place following a threshold number of display impressions; and responsive to determining that an interaction with the high-signal suggestion cell has not taken place following the threshold number of display impressions, removing the high-signal suggestion cell from the content feed interface.

16. The non-transitory computer-readable storage medium of claim 15 wherein the instructions further cause the device to perform operations comprising:
displaying a second high-signal suggestion cell associated with a third user account not associated with the first user account;
receiving a first interaction input with the second high-signal suggestion cell; and
generating an association between the first user account and the third user account based on the first interaction input with the second high-signal suggestion cell.

17. The non-transitory computer-readable storage medium of claim 16 wherein the instructions further cause the device to perform operations comprising:
replacing the second high-signal suggestion cell with a first interactive cell, wherein the first interactive cell is associated with a notification communication between the first user account and the third user account, the notification communication indicating the association between the first user account and the third user account;
wherein the first interactive cell is generated based on a rate of friend adds for the first user account being below a friend add threshold, and wherein the friend add threshold is based, at least in part, on an age of the first user account.

18. The non-transitory computer-readable storage medium of claim 15 wherein the instructions further cause the device to perform operations comprising:

displaying a second high-signal suggestion cell associated with a third user account not associated with the first user account;
receiving a first interaction input with the second high-signal suggestion cell; and
removing the high-signal suggestion cell from the content feed interface based on the first interaction input.

19. The non-transitory computer-readable storage medium of claim 15 wherein the instructions further cause the device to perform operations comprising:
adjusting a cell order within the content feed interface to change an order of the plurality of interactive cells following receipt of at least one content communication from a user account associated with a cell of the plurality of interactive cells while maintaining the high-signal suggestion cell in a first cell position at a top of the content feed interface until the threshold number of display impressions has been met.

20. A computing device comprising a display screen, the computing device configured to:
display on the display screen a content feed interface that includes:
communication cells for a plurality of user accounts associated with a first user account, wherein each of the communication cells is associated with a communication from a user account of the plurality of user accounts that corresponds to a respective user of a content-sharing platform that is included in a social graph of a first user associated with the first user account,
at least one high-signal suggestion cell that is selectable to initiate a connection between a second user account not associated with the first user account such that a second user associated with the second user account is added to the social graph of the first user associated with the first user account, and
a direct user interface target area for display of one or more content elements;
determine a number of display impressions for the at least one high-signal suggestion cell within the content feed interface, the number of display impressions indicating a number of instances of displaying the at least one high-signal suggestion cell within the content feed interface in association with the first user account;
determine that an interaction with the high-signal suggestion cell has not taken place following a set number of actionless displays within the content feed interface; and
responsive to determining that an interaction with the high-signal suggestion cell has not taken place following the threshold number of display impressions, remove the high-signal suggestion cell from the content feed interface.

* * * * *